UNITED STATES PATENT OFFICE.

WILLIAM S. EDELBLUTE, OF DELPHOS, OHIO, ASSIGNOR OF ONE-HALF TO ISAAC McKENZIE, OF DELPHOS, OHIO.

FEEDING-TROUGH.

1,335,568.  Specification of Letters Patent.  Patented Mar. 30, 1920.

Application filed July 23, 1919. Serial No. 312,741.

*To all whom it may concern:*

Be it known that I, WILLIAM S. EDELBLUTE, a citizen of the United States, residing at Delphos, in the county of Allen and State of Ohio, have invented certain new and useful Improvements in Feeding-Troughs, of which the following is a specification.

This invention relates to a trough especially designed for feeding, or watering, hogs, but it can be adapted for use with other live stock if desired.

The object of the invention is to permit the placing of feed in the trough, from one side, termed the "front" while excluding the hogs from the rear side, and to then permit closing of the front side, thus opening to the hogs the rear side. The invention also includes means whereby the trough may be partly open from either side, as when used for watering, and also means for preventing the hogs from getting into the trough, fouling the water with their feet, or crowding together.

With these objects in view the invention consists in the novel features of construction hereinafter described, pointed out in the claim, and shown in the accompanying drawings, in which:—

Figure 1 is a rear elevation of the trough.

Fig. 2 is a section on the line 2—2 of Fig. 1.

Fig. 3 is an end elevation, the gate being shown in position to close the front.

In constructing the device I employ a trough 1, of the ordinary size and shape, and provided with end supports 2. These carry end standards 3 having a number of upper cross bars 4. Along its rear side the trough is provided with a parallel longitudinally extending board 5. Inclined bars 6 extend from the uppermost cross piece 4 to said board 5, and serve the double purpose of spacing the hogs apart, and preventing their crowding into the trough itself or crossing it, thereby getting their feet into the feed or water.

Secured to the lowermost cross piece 4 by hooks 7 and half strap hinges 8 is a gate 9, said gate hanging longitudinally with respect to the trough and swinging transversely with respect to the trough.

The gate is hinged approximately over the longitudinal central line of the trough. Segments 10 are pivotally connected to the lower front portion of the gate and are provided with suitable notches 11, which are adapted to be brought into engagement with points of stops 12 secured to the end pieces 2 and projecting in advance of the trough. A handle 13 connects the forward ends of the segments 10.

It will be noted that when the gate is swung to the position shown in Figs. 1 and 2, held by segments 10 engaging the stops 12 the trough is open from the front for the reception of feed or water, the lower end of the gate resting against the rear edge of the trough and adjacent the bars 6. But on pulling the handle 13 forwardly into the position shown in Fig. 3 the trough is opened from the rear side and closed from the front. An intermediate notch 11 in the segments allows the locking of the gate in a perpendicular position, useful in watering hogs, as this opens the trough sufficiently to give them access to the water, or liquid swill but does not allow them sufficient room to get their feet into the trough, thereby preventing unnecessary fouling of the water.

What I claim is:—

The combination with a trough, inclined bars arranged adjacent the rear side of the trough, a gate hinged to swing transversely with respect to the trough, said gate being hung on the longitudinally central line of the trough, pivoted segments carried by the gate, a handle bar connecting the segments, the segments being notched, and stops arranged in advance of the trough and in position to be engaged by said notches, thereby locking the gate against either side of the trough or in a perpendicular position midway the sides of the trough.

In testimony whereof I affix my signature.

WILLIAM S. EDELBLUTE.

T. A. ERRETT.
OXYACETYLENE CUTTING AND WELDING TORCH.
APPLICATION FILED AUG. 7, 1918.
1,335,569.
Patented Mar. 30, 1920.
2 SHEETS—SHEET 1.
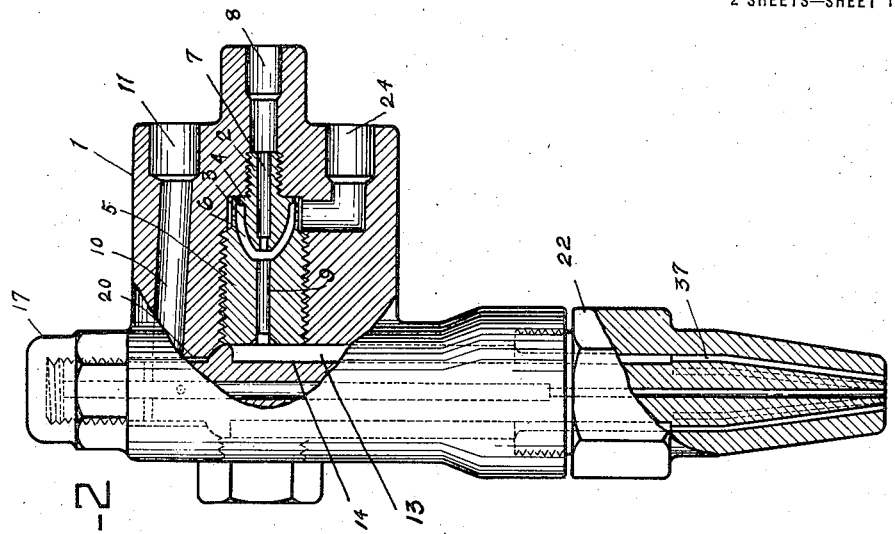
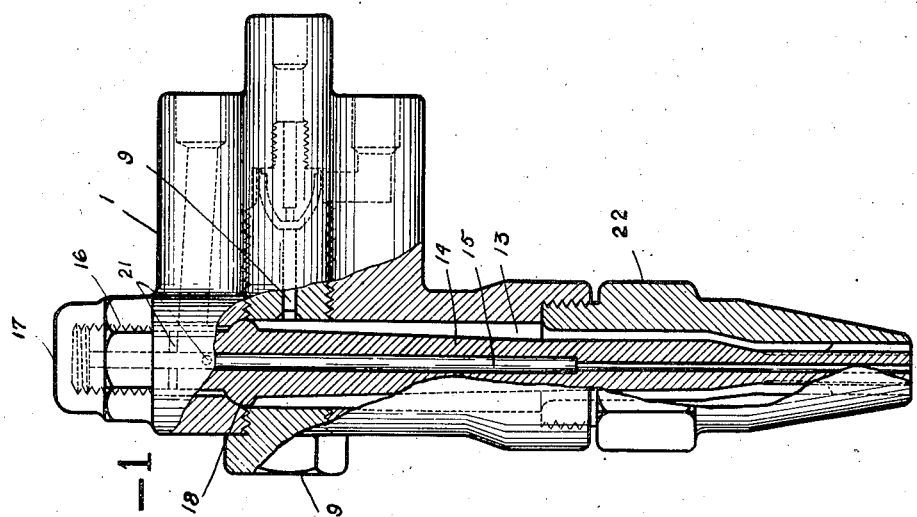
INVENTOR
*Thomas A Errett*
BY
*Richard J. Cook*
ATTORNEY